United States Patent [19]

Elliott

[11] 4,254,067
[45] Mar. 3, 1981

[54] SULPHUR PELLETIZING

[76] Inventor: Herbert J. Elliott, 63 Poulton Estate, Bradford On Avon, Wiltshire, United Kingdom

[21] Appl. No.: 966,459

[22] Filed: Dec. 4, 1978

Related U.S. Application Data

[63] Continuation of Ser. No. 664,619, Mar. 8, 1976, abandoned.

[30] Foreign Application Priority Data

Jun. 3, 1975 [GB] United Kingdom ............... 9386/75

[51] Int. Cl.³ ............................................. B01J 2/02
[52] U.S. Cl. .................................................. 264/13
[58] Field of Search ........................................ 264/13

[56] References Cited

U.S. PATENT DOCUMENTS

| 1,378,084 | 5/1921 | Bacon et al. | 264/13 |
| 3,504,061 | 3/1970 | Elliott | 264/9 |
| 3,761,136 | 9/1973 | Every | 264/13 |

FOREIGN PATENT DOCUMENTS 1161609  8/1969  United Kingdom.

Primary Examiner—Donald E. Czaja
Assistant Examiner—James R. Hall
Attorney, Agent, or Firm—Arthur A. March

[57] ABSTRACT

Process for pelletizing sulphur by forming and solidifying molten droplets of sulphur containing dispersed therewithin an effective minor amount of a mechanical strength improving modifying additive, e.g. 4–10 ppm organopolysiloxane, kerosene, other lower boiling range straight chain hydrocarbon than kerosene, or mixtures thereof, for increasing the mechanical strength of the resultant pellets, such as by contact with water as coolant, either by feeding molten droplets of or an unbroken continuous stream of the molten sulphur-dispersed additive mixture into the water, preferably at a coolant temperature operatively below that of the molten sulphur and above its own freezing temperature and at a molten sulphur-dispersed additive mixture feeding temperature of particularly optionally between about 130°–140° C.; and the resultant pellets of improved close grained, substantially amorphous structure thereby produced.

25 Claims, 1 Drawing Figure

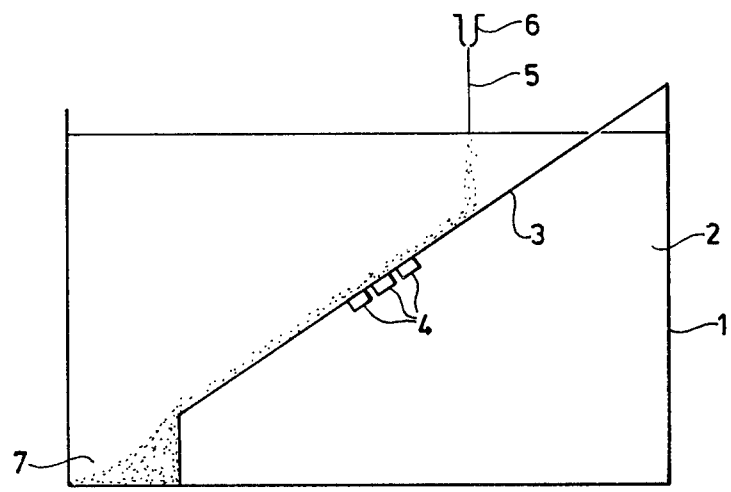

SULPHUR PELLETIZING

This is a continuation of copending application Ser. No. 664,619 filed Mar. 8, 1976 and now abandoned.

BACKGROUND OF THE INVENTION

This invention is concerned with the solidification of molten sulphur, and in particular the pelletizing of sulphur. Natural sulphur is usually extracted by techniques which result in large quantities of molten sulphur. It is desirable for packaging and transportation that the sulphur should be in an easily manageable solid form. Pellets are a particularly attractive solid form if the generation of hazardous fines can be avoided both during pelletization and subsequent handling. It is also desirable for sulphur obtained in other solid forms, for example powders or slurries resulting from desulphurization process and bulk solid sulphur in sulphur "vats," to be converted to pellets for further handling. It is particularly important that the sulphur pellets should have sufficient mechanical strength to withstand transportation and mechanical handling.

PRIOR ART

The prior art contains many proposals for converting molten sulphur into pellets. These may be roughly divided into "dry" processes and "wet" processes in which molten droplets of sulphur are formed and solidified in air and a liquid coolant respectively.

Dry processes include pumping atomised molten sulphur into a fluidized bed of "primary" sulphur particles as described in British Pat. No. 962,265 (PEC) and conventional prilling wherein molten droplets are allowed to solidify by falling through an air cooled tower. A process of this type is described in British Pat. No. 1,225,116 (Fisons).

In "wet" processes the pellets must be dewatered and it is important that they are free from moisture traps. In U.S. Pat. No. 3,334,159 (Campbell) molten droplets are allowed to solidify by falling freely through a water coolant tank. In U.S. Pat. No. 3,504,061 (Elliott), the water coolant is swirled to keep the pellets suspended until solidification is completed and the accumulated pellets do not agglomerate. Canadian Pat. No. 824,608 (Ellithorpe) describes the spraying of molten sulphur through a coolant atmosphere of atomised water. It has been found that pellets formed by the break up of a continuous stream of molten sulphur poured into a coolant contain a characteristic J-shaped internal cavity which weakens the pellet.

It has been proposed to treat the outer surface of fertiliser granules with coating compositions containing organosilicon compounds to prevent caking of the granules, see for example British Pat. Nos. 1,189,335 (ICI) and 1,161,609 (Midland Silicones). For similar reasons, it is proposed in U.S. Pat. No. 3,504,061 already mentioned to add organosilicon compounds and surface active agents to the coolant.

SUMMARY OF THE PRESENT INVENTION

According to the present invention it has been surprisingly discovered that the addition of a small but effective amount of an organopolysiloxane fluid to molten sulphur prior to droplet formation and solidification results in pellets of improved mechanical strength, which is maintained or even increased on aging, in contrast to many prior art pellets which deteriorate in strength.

Fluids which have been found to be particularly effective are dimethyl polysiloxanes, for example the fluids marketed by Dow Corning under the designation DC200 and DC220, and, more preferably methyl phenyl polysiloxanes, for example Dow Corning fluids DC510, DC550, DC556 and DC710.

It has also been found to be similarly effective to use kerosene (typically boiling at about 150° C.), or other straight chain hydrocarbons of lower boiling range, either in combination with the above polysiloxanes or alone.

A suitable amount of the additive to the sulphur melt may easily be determined by routine experiment, but typically the additive is present at 4 to 10 ppm of sulphur. Larger quantities do not cause any appreciable increase in effectiveness, and too much additive can inhibit droplet formation when this occurs in a liquid coolant. The quantity of kerosene should be regulated so that there is no accumulation of kerosene on the surface of a liquid coolant, as in such a situation a sticky film forms on the pellets and adhesion results.

The additives of the present invention may be applied effectively to any sulphur pelletizing process, including those outlined in the discussion of prior art above, simply by dispersing the additives in the molten sulphur before droplet formation.

It is preferred to form sulphur pellets by pouring an unbroken stream of molten sulphur into a water bath. In such a process the sulphur stream breaks up into droplets just below the water surface. The polysiloxane and kerosene additives result in a pellet which has improved water shedding properties as well as improved strength. The pellets have a close grained, substantially amorphous structure. The pelletizing process advantageously incorporates the features which form the subject of copending application Ser. No. 664,602, filed Mar. 8, 1976 now abandoned the disclosure of which is incorporated herein by reference.

In pelletizing in a water coolant it has been found beneficial to employ a phenyl methylpolysiloxane or kerosene as additive as these appear to modify the surface of the molten sulphur droplets so that they are more readily wetted by the water coolant and thus promote earlier solidification than would otherwise take place. This effect may be utilised by using less coolant depth than previously while maintaining the same coolant temperature, or using the same coolant depth at increased temperature. It is also found that higher melt feed temperatures may be used when an additive of the present invention is present, though care must be taken by routine experiment to determine that increase of temperature does not destroy the effectiveness of the additive. In this respect, the phenyl methyl polysiloxanes appear to withstand higher feed temperatures than the dimethyl polysiloxanes. The dimethyl polysiloxanes are equally effective as the other additives in the properties of the end product but they do not appear to modify the surface of the droplets in the same way to promote early solidification and a greater coolant depth may be required in a process as outlined above. It must be emphasised that the mechanism by which the additives achieve their effect is not yet entirely understood and the above comments are for guidance only.

As general parameters for pelletizing into a water coolant, molten sulphur feed temperatures typically range from 130° to 140° C. and coolant temperatures from just above freezing point to 140° F., preferably 70° to 100° F. As mentioned above, at the upper ends of these ranges the preferred additive is a phenyl methyl polysiloxane. In its simplest form, the process of the present invention comprises introducing unbroken streams of molten sulphur and dispersed additive into water tank from nozzles of e.g. 1.5 to 2.5 mm exit diameter spaced at 1½" to 3" centres, and allowing the molten droplets which form to solidify while falling freely through the coolant and collect in a sump. The pellets may be removed from the sump by pumps, water jets or screw conveyors, or through a callow valve in the base, for dewatering.

DESCRIPTION OF THE DRAWINGS

The FIGURE shows in sectional side elevation an installation as disclosed in copending application Ser. No. 664,602, now abandoned, which was used to prepare samples for the comparative lists described hereinafter.

DETAILED DESCRIPTION

The installation shown in FIG. 1 comprises a tank 1 containing water 2 at approximately 48° F. Immersed within the tank was ramp 3 of aluminium 1/16" plate at an angle of 40°. Attached to the plate were three ultrasonic transducers 4 supplied by Dawes Instrument Co. Limited, which were operated at a power of 5 watts each at 25 Khz. Molten sulphur was poured at a temperature of 130°/135° C. in an unbroken stream 5 from a nozzle 6 of exit diameter 2 mm at a height of about 4" above the water surface. The stream of molten droplets contacted the ramp at about 6" below the water surface and observed to have solidified after about 3" to 4" run along the ramp. The solidified pellets were removed from a sump 7.

Test runs were conducted with sulphur containing 5 ppm of each of Dow Corning silicone fluids DC710 and DC556 (phenyl methyl polysiloxane) (SAMPLE 1) and untreated sulphur (SAMPLE 2). In the following tests for mechanical stress these samples were compared with pellets obtained by the fluidized bed process of British Pat. No. 962265 (SAMPLE 3) and obtained by the swirled coolant process of U.S. Pat. No. 3,504,061 (SAMPLE 4).

Prior to the comparative tests the samples were allowed to age for 3 weeks. To assess the tendency of each sample to produce dust under mechanical stress, the samples were subjected to abrasion, compaction, impact and vibration tests. For the purposes of these tests particles passing through a 60 mesh screen were considered to constitute dust. The values given in the Tables A and B for the % passing a given mesh size are Δ values, i.e. the % passing a given mesh after test minus the % passing that mesh in the sample before test.

Table A compares the 60 mesh Δ values (i.e. "dust") for each sample for each test. Table B shows the Δ values for a wider range of mesh sizes for each test.

The tests were performed as follows.

Abrasion

To measure the effect of abrasion, the sulphur samples were tumbled in a V-mixer, thus minimizing impact of sulphur against the walls of the apparatus. A sample was placed in a plexiglass V blender (Twin Shell Dry Blender Model LB-4264). The blender was operated at 9 rpm for a period of 2 hours. The sample was then retrieved and sieved.

Compaction

The test for compaction involved submitting the sulphur samples to a pressure, based on the bulk density of formed sulphur, corresponding to a stockpile of approximately 100 ft. The sample in a suitable container was subjected in a hydraulic press for 10 minutes, to a pressure of 45 psi. Sieve analyses were carried out in the usual way.

Impact

The effect of impact was measured by dropping samples onto an aluminium plate. Samples were dropped from a box having an appropriate trap door down a 12 inch diameter galvanized pipe and onto a ⅜ inch thick aluminium plate. A plastic bag was affixed around the base plate to ensure that no sample was lost. A drop height of 25 feet was used. Sieve analyses were carried out as described.

Vibration

Solid sulphur is likely to be exposed to vibration in rail cars and ships' holds. The effect of this stress on the sulphur samples was tested by subjecting the samples to a vibration of 60 cps for one hour. Samples of the product under examination were placed in a four liter stainless steel beaker (inside diameter, 6"), covered, and taped to a Syntron vibrating table, (Model VP 51-B). A hard rubber pad, ¼" thick, was placed under the beaker to prevent chatter, and the table was operated at 60 cps for one hour. A setting of 50% of maximum amplitude was used. Sieve analyses were carried out as described.

For each test 500 grams of material was used. Each test was performed in triplicate. The material prior to testing was screened through 18, 35, 60 and 100 mesh sieves corresponding to openings of 1,000, 5,000, 250 and 150 microns. The particle size distribution was recorded as cumulative percent passing each screen. Material passing the 100 mesh sieve was discarded. Following the test the sample was subjected to the same sieve analysis and the results were again tabulated as cumulative percent passing each screen.

TABLE A

| EFFECT OF MECHANICAL STRESS Δ % PASSING 60 MESH | | | | | |
|---|---|---|---|---|---|
| Sample | Abrasion | Compaction | Impact | Vibration | Total |
| 1 | 0.1 | 0.1 | 0.3 | 0.0 | 0.5 |
| 2 | 0.1 | 0.1 | 1.3 | 0.1 | 1.6 |
| 3 | 0.0 | 0.1 | 0.6 | 0.0 | 0.7 |
| 4 | 0.1 | 0.2 | 2.5 | 0.2 | 3.0 |

TABLE B

| SIEVE ANALYSIS AFTER INDIVIDUAL TESTS CUMULATIVE % PASSING (Δ VALUES) | | | | |
|---|---|---|---|---|
| | MESH | | | |
| | 100 | 60 | 35 | 18 |
| | MICRONS | | | |
| Sample | 150 | 250 | 500 | 1000 |
| ABRASION | | | | |
| 1 | 0.0 | 0.1 | 0.0 | 0.2 |
| 2 | 0.1 | 0.1 | 0.1 | 0.8 |
| 3 | 0.0 | 0.0 | 0.0 | 0.0 |
| 4 | 0.1 | 0.1 | 0.1 | 0.2 |
| COMPACTION | | | | |
| 1 | 0.0 | 0.1 | 0.1 | 0.1 |
| 2 | 0.0 | 0.1 | 0.3 | 0.6 |

TABLE B-continued

SIEVE ANALYSIS AFTER INDIVIDUAL TESTS
CUMULATIVE % PASSING (Δ VALUES)

| Sample | MESH | | | |
|---|---|---|---|---|
| | 100 | 60 | 35 | 18 |
| | MICRONS | | | |
| | 150 | 250 | 500 | 1000 |
| 3 | 0.0 | 0.1 | 0.1 | 0.2 |
| 4 | 0.1 | 0.2 | 0.4 | 0.8 |
| IMPACT | | | | |
| 1 | 0.1 | 0.3 | 1.8 | 6.2 |
| 2 | 0.7 | 1.3 | 4.1 | 10.4 |
| 3 | 0.3 | 0.6 | 1.3 | 3.0 |
| 4 | 1.0 | 2.5 | 5.2 | 10.7 |
| VIBRATION | | | | |
| 1 | 0.0 | 0.0 | 0.0 | 0.0 |
| 2 | 0.0 | 0.1 | 0.1 | 0.3 |
| 3 | 0.0 | 0.0 | 0.0 | 0.1 |
| 4 | 0.1 | 0.2 | 0.3 | 0.4 |

Results

As can be seen from the Tables, Sample 2 (according to said copending application Ser. No. 664,602, now abandoned) showed improved results over Sample 4 (according to U.S. Pat. No. 3,504,061). This is considered to be due to modification of the internal cavity inherent in the pellets produced by the process according to the invention of said copending application and general consolidation of the pellet under the influence of the ramp and ultrasonic pressure waves.

However, Sample 1 (according to the present invention) shows the direct improvement obtained by use of the silicone additive when compared to Sample 2, and also performs better than Sample 3 (according to British Pat. No. 962,265, and which process is generally considered to produce among the strongest sulphur pellets commercially available).

It will be appreciated that with respect to whatever sulphur melt feed temperature is selected, the coolant temperature will normally be below that temperature to provide an inherent cooling temperature differential to insure efficient droplet and/or pellet formation and/or solidification, e.g. where water is used as liquid coolant.

In the case of the kerosene and other lower boiling range hydrocarbons than kerosene, these modifying additives may be conveniently collectively termed normally lower boiling range hydrocarbons, e.g. having a boiling range of about 150°-280° C.

The ramp and acoustic pressure wave features, more fully disclosed in said copending application and which commonly herewith corresponds to British application No. 9386/75, inherently impart mechanical consolidating force relatively radially inwardly against the exterior of the droplets/pellets, whereby to enhance the desired results achievable herein.

It will be appreciated that the foregoing specification and examples have been set forth by way of illustration and not limitation, and that various changes and modifications may be made therein without departing from the spirit and scope of the present invention, which is to be limited only by the scope of the appended claims.

What is claimed is:

1. Process for pelletizing sulfur which comprises solidifying individual molten droplets of sulfur which correspondingly contain dispersed therewithin an effective minor amount of a mechanical strength improving modifying additive and which is sufficient for increasing the mechanical strength of the resultant solidified individual pellets as compared to that of the corresponding sulfur pellets which have been solidified without such additive being dispersed in the molten droplets.

2. Process according to claim 1 wherein the additive is selected from the group consisting of organopolysiloxane, kerosene, lower boiling range hydrocarbon, and mixtures thereof.

3. Process according to claim 1 wherein the additive is organopolysiloxane.

4. Process according to claim 1 wherein the additive is dimethylpolysiloxane.

5. Process according to claim 1 wherein the additive is methylphenylpolysiloxane.

6. Process according to claim 1 wherein the additive is present in an amount of between about 4–10 ppm based on the sulfur content.

7. Process according to claim 1 wherein the solidifying of the molten droplets is carried out by contacting the individual molten droplets with a coolant.

8. Process according to claim 1 for pelletizing sulfur which comprises
forming into individual molten droplets molten sulfur which contains dispersed therewithin an effective minor amount of an additive selected from the group consisting of organopolysiloxane, kerosene, other lower boiling range hydrocarbons, and mixtures thereof, and which is sufficient for increasing the mechanical strength of the resultant solidified individual pellets as compared to that of the corresponding sulfur pellets which have been solidified without such additive being dispersed in the molten sulfur, and
solidifying the individual molten droplets thereby formed into the corresponding individual solidified pellets.

9. Process according to claim 8 wherein the solidifying of the individual molten droplets is carried out by contacting the individual molten droplets with a coolant.

10. Process according to claim 9 wherein the forming and solidifying of the individual molten droplets is carried out by contacting an unbroken stream of molten sulfur containing the additive dispersed therewithin, with a coolant.

11. Process according to claim 9 wherein the individual molten droplets are solidified into individual pellets having a close grained, substantially amorphous structure.

12. Process according to claim 9 wherein the molten sulfur is at a feed temperature of between about 130°–140° C. and the coolant is a liquid at a coolant temperature which is above the freezing point of the liquid and below the molten sulfur feed temperature.

13. Process according to claim 1 for pelletizing sulfur which comprises
solidifying individual molten droplets of sulfur which correspondingly contain dispersed therewithin an effective minor amount of between about 4–10 ppm based on the sulfur content of an additive selected from the group consisting of organopolysiloxane, kerosene, other lower boiling range hydrocarbon than kerosene, and mixtures thereof, by contacting the individual molten droplets with a coolant, to form individual solidified pellets having a close grained substantially amorphous structure.

14. Process according to claim 13 for pelletizing sulfur which comprises forming and solidifying individual molten droplets of sulfur which correspondingly contain dispersed therewithin an effective minor amount of between about 4–10 ppm based on the sulfur content of an additive selected from the group consisting of organopolysiloxane, kerosene, other lower boiling range hydrocarbons than kerosene, and mixtures thereof, by contacting an unbroken stream of molten sulfur containing the additive dispersed therewithin, with a coolant, to form individual solidified pellets having a close grained, substantially amorphous structure.

15. Process according to claim 14 wherein the coolant is water and the additive is organopolysiloxane.

16. Pelletized solidified sulfur product produced according to claim 1.

17. Pelletized solidified sulfur product produced according to claim 2.

18. Pelletized solidified sulfur product produced according to claim 3.

19. Pelletized solidified sulfur product produced according to claim 6.

20. Pelletized solidified sulfur product produced according to claim 11.

21. Pelletized solidified sulfur product produced according to claim 13.

22. Pelletized solidified sulfur product produced according to claim 15.

* * * * *